ELECTRICAL PULSE SECRECY COMMUNICATION SYSTEM

Original Filed Dec. 31, 1941 5 Sheets-Sheet 1

INVENTOR
EDMOND M. DELORAINE
EMILE LABIN
BY
Percy P. Lantzy
ATTORNEY

ELECTRICAL PULSE SECRECY COMMUNICATION SYSTEM

Original Filed Dec. 31, 1941 5 Sheets-Sheet 2

INVENTORS
EDMOND M. DELORAINE
EMILE LABIN
BY Percy P. Lantzy
ATTORNEY.

ELECTRICAL PULSE SECRECY COMMUNICATION SYSTEM

Original Filed Dec. 31, 1941 5 Sheets-Sheet 3

INVENTORS
EDMOND M. DELORAINE
EMILE LABIN
BY Percy P. Lantzy
ATTORNEY.

Jan. 22, 1952 E. M. DELORAINE ET AL 2,582,968

ELECTRICAL PULSE SECRECY COMMUNICATION SYSTEM

Original Filed Dec. 31, 1941 5 Sheets-Sheet 4

INVENTOR.
EDMOND M. DELORAINE
EMILE LABIN
BY Percy P. Lantzy
ATTORNEY.

Jan. 22, 1952 E. M. DELORAINE ET AL 2,582,968

ELECTRICAL PULSE SECRECY COMMUNICATION SYSTEM

Original Filed Dec. 31, 1941 5 Sheets-Sheet 5

INVENTOR.
EDMOND M. DELORAINE
EMILE LABIN
BY
Percy P. Lantzy
ATTORNEY.

Patented Jan. 22, 1952

2,582,968

UNITED STATES PATENT OFFICE 2,582,968

ELECTRICAL PULSE SECRECY COMMUNICATION SYSTEM

Edmond M. Deloraine, Paris, France, and Emile Labin, New York, N. Y., assignors to Federal Telephone and Radio Corporation, New York, N. Y., a corporation of Delaware Continuation of application Serial No. 425,108, December 31, 1941. This application October 10, 1945, Serial No. 621,584

41 Claims. (Cl. 250—6)

The present invention relates to systems of communication and more particularly to signaling systems providing a measure of secrecy.

The present invention is a continuation of our application Ser. No. 425,108, filed December 31, 1941, now abandoned, and is closely related to and in some of its aspects constitutes an improvement over the copending application of Emile Labin, filed April 1, 1941, Serial No. 386,282, now U. S. Patent No. 2,406,019, granted August 20, 1946, relating to Pulse Modulation Systems.

One object of the invention is to guard the secrecy of a message which is transmitted by one method, e. g., by some uncommon modulation method, by simultaneously sending a masking message by another method, e. g., by a more usual form of modulation. The masking message conveys information which is unimportant and its detection by an unauthorized person will aid in the concealment of the secret message.

More specifically, it is an object of the present invention to provide a signaling system wherein secret signals which are conveyed by time modulation of pulses are screened from observation by modulating the amplitude of the pulses and thus sending amplitude modulated signals on the same channel.

According to another feature, signal receivers are arranged to receive intelligibly the messages in spite of the simultaneous reception of messages and jamming signals.

Another object of the invention is a receiver responsive to signals whose amplitude and time positions are modulated, and arranged to reproduce the amplitude modulation of the signals and separately to reproduce the time modulation of the signals.

In the preferred embodiment of our invention, the masking message and the masked secret message are used to amplitude and time modulate the same pulses. However, it is within the scope of our invention to provide additional pulses interspersed between the pulses which are time modulated by the secret signal, and to modulate the amplitude or timing or both, of said additional pulses with the unimportant masking signal.

According to a feature of the present invention, a signaling system comprises a jamming transmitter and one or more message signal transmitters and receivers of the above mentioned type. The jamming transmitter and at least one of the signal transmitters are remote from one another but are synchronized.

Preferably, the desired timing of a signal transmitting station with respect to a remote jamming station is accomplished by means provided at the signal transmitting station. However, the relationship may be reversed and the timing means provided at the jamming station.

The simultaneous operation of a jamming and a signal transmitting station is useful not only defensively for enhancing the secrecy of the transmitted signals, but also offensively for interfering with communications of an enemy.

A transmitter as well as a combination transmitter and receiver capable of performing some or all of the above mentioned functions form separate objects of the invention.

These and other objects of our invention may best be understood from the appended claims and the following description of certain embodiments thereof as applied to the drawings, in which:

Figure 1:
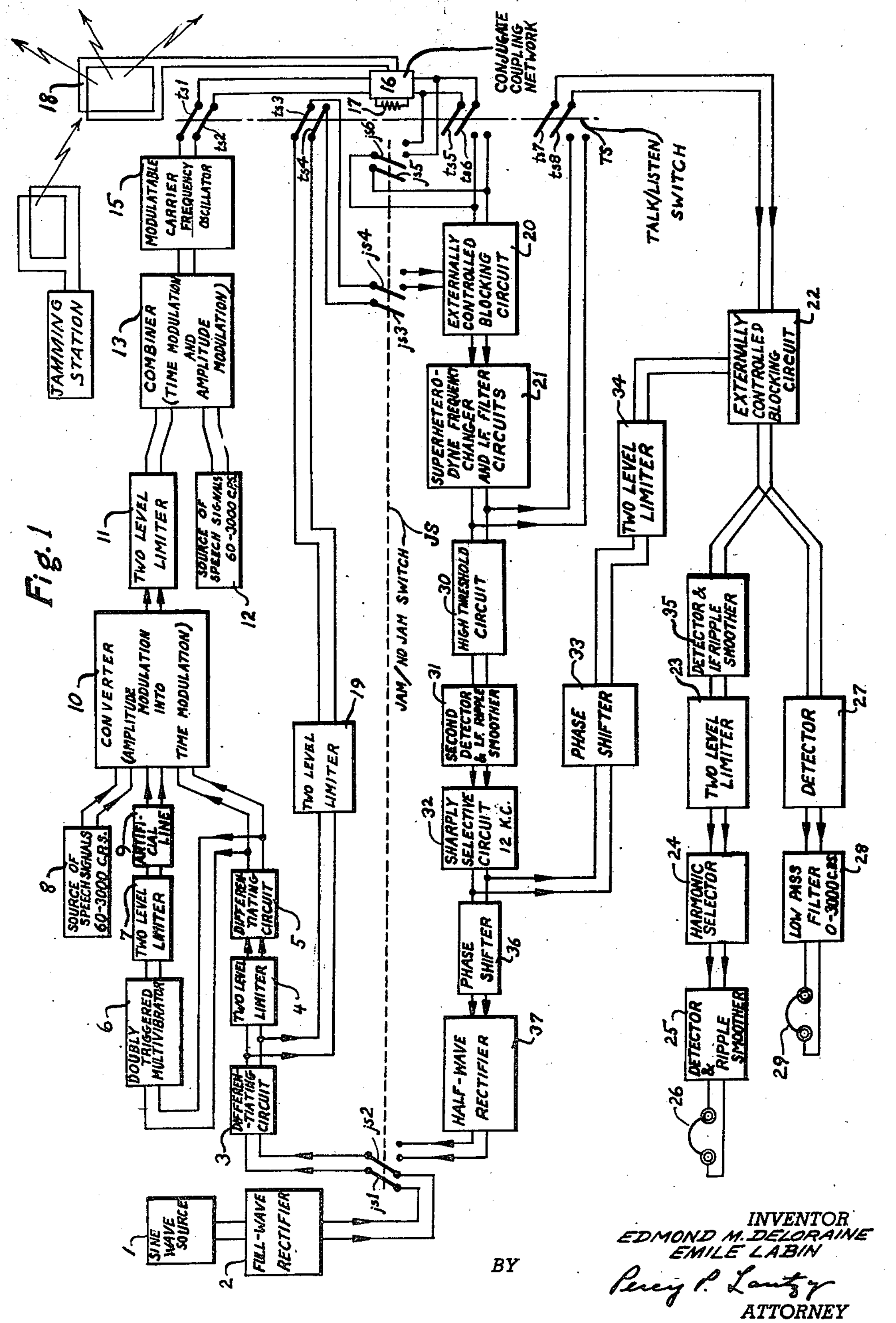
Fig. 1 represents a combined signal transmitting and receiving station in accordance with our invention.

Referring more specifically to Fig. 1, 1 is a stable source of sine waves of a frequency high in comparison with the highest signal frequency to be transmitted. Thus, if signals to be transmitted are low quality speech signals in the range of 60–3000 cycles per second, the wave source 1 may be a stable oscillator of 6 kc. frequency.

Elements 2, 3 and 5 are respectively a full wave rectifier, a differentiating circuit such as a condenser-resistance circuit and another differentiating circuit which may be the same as 3 or different therefrom. The effect of rectifier 2 is to convert the sine wave into a half sine wave, such as shown in the left part of curve J, Fig. 6. This is then twice differentiated, yielding, after the first differentiation, a wave such as shown at K of Fig. 6, and after the second differentiation, a wave like M of Fig. 6, consisting of a series of uniformly spaced needle sharp pulses. Between elements 3 and 5 there is preferably a limiter circuit 4 provided which, in well known fashion, passes only so much of the applied signal as lies between two fixed levels of amplitude. Such level limiters are well known and may, for example, be constituted by a vacuum tube biased below cut-off (whereby signals weaker than a given lower level are eliminated), and having the input signal applied to its grid through a high impedance (whereby all signals having an amplitude greater than that required for drawing grid currents are cut off). Preferably, the two levels of limiter 4 are chosen as shown by dot-and-dash lines $x$ and $y$ in curve K of Fig. 6, so that a large part of the positive portion of the output of differentiating circuit 3 is transmitted through the limiter 4, but none of the negative portion.

The sharp pulse output of the second differentiating circuit 5 is, together with two other impulses, applied to a converter unit 10, hereafter more fully described.

Part of the energy from the output of the second differentiating circuit 5 is applied to a control element 6. This element 6 is essentially a multi-vibrator adjusted to operate at a frequency somewhat below 6 kc. with substantially equal times of dwell in both its conditions of quasi-stability. The input circuit to such multi-vibrator is arranged in known manner so that a pulse of a given polarity (say positive), is capable of triggering the multi-vibrator from a condition B to a condition A, if the multi-vibrator has for some time been in condition B and is almost ready spontaneously to shift over to condition A.

Multi-vibrators having their input circuits so arranged are known and are usually designated as doubly triggered or doubly controlled multi-vibrators. The output of multi-vibrator 6 passes to another two-level limiter 7 whereby the sloping tops of the positive and negative saw teeth which constitute the output of 6 are flattened out so as to produce almost perfectly rectangular wave form. The square wave output from 7 is applied through an artificial line 9 to converter unit 10.

The third input of converter unit 10 comes from a speech signal source 8, such as a telephone which, in the embodiment shown, produces speech signals of low fidelity lying between the frequency limits of 60 and 3000 c. p. s., the signals from source 8 being the secret signals whose very existence it is desired to conceal.

The converter unit 10 to which are applied the needle-like signals from 5, the square block signals from 7 and the speech signals from 8, is a circuit serving to convert the amplitude changes of speech signals 8 into time modulation of the needle sharp pulses from 5. Such circuit is disclosed in the copending application of Emile Labin above referred to and is illustrated in detail in Fig. 3. Essentially it consists of a push-pull amplifier comprising two tubes 62 and 63, and a doubly triggered multi-vibrator comprising two tubes 80 and 90 and controlled by the output of said push-pull amplifiers 62, 63. The details of application of the signal to the push-pull amplifier 62, 63, as well as the details of adjustment of the multi-vibrators 80 and 90 will be described in connection with the operation of the system.

The converter unit 10 performs the function of time modulating the pulses received from circuit 5 in accordance with the speech or other message from source 8 whose secrecy is desired to preserve. The output of converter 10 consists of a series of sharp pulses which are normally unequally spaced and which become more unequally spaced in response to positive signal amplitudes from 8 and on the other hand tend to become more equally spaced in response to negative signal amplitudes from 8. In other words, the successive pulses are displaced toward and away from each other in "push-pull" according to the instantaneous values of signal energy. A two-level limiter 11 receives the output of said converter 10 and serves to render the needle-like pulses of constant amplitude so that only the time position variations of these pulses are passed to the output of 11.

Element 12 is another source of low fidelity speech or other message signals of 60–3000 c. p. s., such as a telephone or microphone. This is the source of the unimportant or message masking the secret message originating in source 8. The variable amplitude output of source 12 is combined with the constant amplitude time modulated needle-like pulses from limiter 11 in a combining unit 13. This may be an ordinary modulator arranged to modulate the signals from 11 in accordance with the amplitude of the signals from 12. The output of combining unit 13 consists of a number of needle-like pulses whose time position is the same as in the output of converter 10 and limiter 11, but whose amplitudes correspond to the amplitudes of the speech signals from 12.

The carrier frequency oscillator 15 is modulated in known manner by the signals from combining unit 13 and yields a brief train of carrier frequency waves for each needle-like pulse in the output of combiner 13. The combiner 13 delivers about 12,000 sharp pulses in one second and, preferably, the duration of each pulse is of the order of 1 to 10 microseconds. Such signals could suitably be carried on an ultra-high carrier frequency of 50 to 500 megacycles.

The output of oscillator 15 consists of a number of trains of carrier waves, of say 300 megacycles frequency, each train being 600 wavelengths long (i. e. 2 microseconds in duration). The different trains are spaced roughly $\frac{1}{12}$ of one hundredth of a second apart in time but the spacings between successive waves are alternately larger and smaller than this, the difference between two adjacent spacings being normally about 4 microseconds, increased by as much as 8 microseconds during intervals of maximum positive signal from source 8 and decreased toward zero during intervals of maximum negative signal from source 8.

In addition to the variation in spacing of the successive wave trains, their amplitudes are also varied in accordance with the momentary amplitudes of the signals from source 12. The customary receiver will readily detect the amplitude modulation which corresponds to the signals from 12 but will not the time duration signals corresponding to the speech from source 8. Moreover, it will not ordinarily be suspected that there are any other signals than the amplitude modulated signals corresponding to the speech from source 12.

The time and amplitude modulated brief trains of carrier waves from oscillator 15 are delivered over conjugate coupling network 16 to $a$, preferably, directive antenna 18. Impedance 17 represents a balancing impedance or artificial line or the like, simulating antenna 18. The conjugate coupling network 16 is of any known type which preserves conjugacy between one pair of terminals (the leads from the output of oscillator 15) and another pair of terminals (the leads to the input of element 20), and yet provides coupling between each pair of terminals and the antenna 18.

Signals which may be radiated from another similar station are detected in the receiving part of the equipment comprising elements 20—29 and 30—34. A talk/listen switch TS is provided to connect antenna 18 through the coupling network 16 either with the receiving or with the transmitting equipment.

In the position shown with its knife blades switch TS is in the talk position. For listening the switch is thrown downward. When switch TS is in listening position, antenna 18 is connected via network 16 to unit 20. This unit is an externally controlled blocking circuit normally biased to pass freely signals but adapted to block the passage of signals in response to certain external signals.

Assuming that a switch JS is in the position shown with its knife blades js3-6 disconnected from the terminals of 20 and 16, no external blocking signals can be applied to unit 20 and therefore, no blocking will occur. Unit 20 will, therefore, convey the signal received on the antenna to receiver 21. This contains a superheterodyne frequency changer preceded by the required radio frequency selectivity and followed by one or more intermediate frequency band filter circuits.

From the output of receiver unit 21 the signal, which is now in intermediate frequency form, passes over contacts ts7 and 8 of switch TS to unit 22. Like unit 20, this is an externally controllable blocking circuit, but unlike circuit 20, it is normally biased to block the signals and will pass signals from its right hand terminals to its left hand terminals only in response to the application of a sufficiently great control potential to its upper terminals.

Whenever the blocking circuit 22 is conditioned to pass signals, the signals from receiver unit 21 will be applied to units 35 and 27. Unit 27 is an ordinary second detector and, therefore, yields an output in the form of sharp pulses modulated in amplitude in accordance with the masking message. The output of detector 27 is applied to a low pass filter 28 having a cut-off at 3000 cycles per second, thus eliminating not only the IF ripple but also the 12 kc. pulse frequency. The only signals which pass through the filter 28 are the amplitude modulated signals corresponding to the masking speech signals which were originally derived from the source 12. Such messages are received in earphones 29.

Unit 35, which shares with unit 27 the energy from blocking circuit 22 is a first detector which may be of conventional design. It comprises ripple smoothing means for eliminating the IF ripple without greatly attenuating signal frequencies of 66 kc. The intermediate frequency is only a little higher than 66 kc. and it may be desirable to use filter means rather than only by-pass condensers for performing this ripple smoothing function.

The output of detector unit 35 will consist of sharp pulses spaced roughly $\frac{1}{12}$ of a second apart, but having a slight variation in spacing to correspond to the secret speech signal and having also a variable amplitude to correspond to the masking speech signal.

The pulses are next applied to unit 23 which is a two-level limiter adjusted to eliminate noise voltages of substantially lower amplitude than the pulses of signal current and, in addition, to eliminate the amplitude variations of these signal pulses which resulted from modulation by the masking speech signals. Preferably the two levels of limiter 23 are set near to each other and near to one-half the amplitude of the signal pulses so that most amplitude modulation and noise be eliminated by the limiter 23, leaving only time modulation as represented by the variable time positions of the pulses.

The output of limiter 23, consisting of about 12,000 pulses per second, is passed through a harmonic selector 24 which is adapted to select the eleventh harmonic having half the apparent repetition frequency, namely, 66 kc. This harmonic selector should, therefore, be a band pass filter or a somewhat broadly tuned circuit whose output varies in amplitude at a rate corresponding to the maximum essential frequency of the secret speech signals. In accordance with the theory more fully set forth in the copending application of Emile Labin above referred to, the momentary amplitude of any odd harmonic of half the pulsing rate has an amplitude which varies in accordance with the signals from the secret signal source 8. The amplitude of the output from unit 24 will, therefore, have an envelope corresponding to the desired secret speech signals.

This output is applied to unit 25 which is a detector and 66 kc. ripple smoother, and the detected and smoothed signals are then made audible in earphones 26.

A two-level limiter unit 19, phase shifters 33, 36 and half-way rectifier 37 remain ineffective when the JS switch is in the left hand position illustrated. Their functioning will be explained later.

JAMMING STATION

Figure 2:
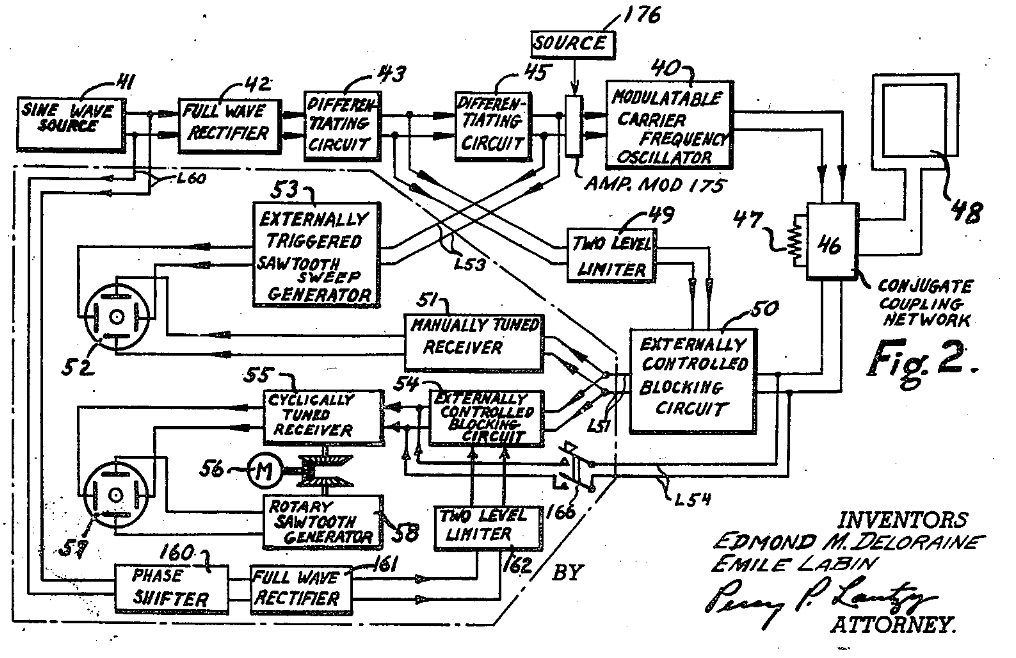
Fig. 2 represents a jamming and monitoring station for use in the system.

Fig. 2 is a block diagram representing a jamming signal transmitting station suitable for use in combination with the signal transmitting and receiving station of Fig. 1. The jamming station comprises means for generating uniformly spaced needle-like pulses and means for producing a carrier frequency modulated or keyed by said pulses so as to yield uniformly spaced brief trains of carrier frequency. The means for generating sharp pulses comprises a sine wave source 41, a full wave rectifier 42, and two differentiating circuits 43 and 45. The elements 41, 42, 43 and 45 are like the elements 1, 2, 3 and 5 of Fig. 1. The means for producing a carrier wave modulated in accordance with the needle-like pulses is a modulatable oscillator 40 connected to be modulated by the output of differentiating circuit 45.

The output of oscillator 40 is supplied to antenna 48 through a conjugate coupling network 46, an artificial line or balancing impedance 47 being connected to the network 46 to balance antenna 48.

Although several additional elements are illustrated in Fig. 2, a useful and operative system may be constructed from two or more combined signal transmitting and receiving stations according to Fig. 1, and a jamming station having only elements 41, 42, 43, 45 and 48 of Fig. 2. The elements 46 and 47 are in such case unnecessary. Such a simple system, which will hereinafter be referred to as System A, constitutes one embodiment of the present invention for jamming enemy transmission and secretly transmitting a message from a combined signal transmitting and receiving station to a friendly signal receiving and transmitting station. The presence of the secret message is doubly screened; it is in the first place concealed by the jamming signals from the jamming station, and second, it is concealed by the above described amplitude modulation of the signaling wave itself in accordance with signals from source 12.

Since System A is one of the simplest embodiments of the present invention, it will first be described.

OPERATION OF SYSTEM A

*Transmission of signal pulses in the absence of jamming pulses*

The transmission of a message from one combined transmitting and receiving station, such as illustrated in Fig. 1 to another similar station may take place either in the presence or absence of jamming signals. Assume first that secret signals are transmitted from one combined station to the other when the jamming station is not in operation.

The station desiring to transmit the message will have, as shown in Fig. 1, its talk-listen switch and its jam/no jam switch to the left. The operation under these conditions has already been described. Here we shall explain only the converter in greater detail.

Figure 3:
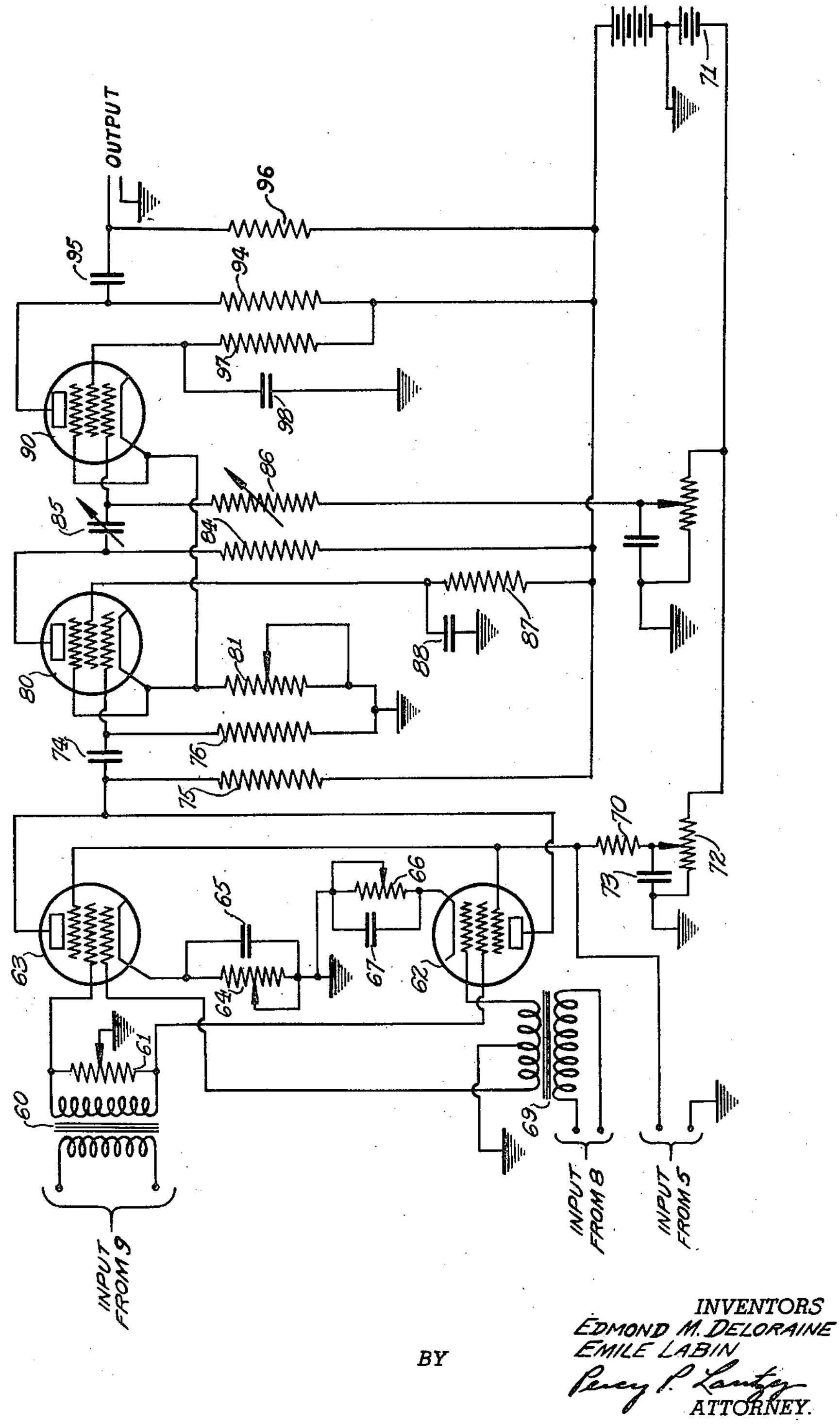
Fig. 3 is a detailed schematic circuit of the converter unit, shown in Fig. 1.

Referring to Fig. 3, the rectangular waves from 7 are applied to vacuum tubes 62 and 63 in such a way as effectively to undergo full wave rectification. The tubes are arranged push-pull, are biased beyond cut-off and their output is taken off in parallel. If the input were applied perfectly symmetrically and the two tubes were identical, then symmetrical full wave rectification of the rectangular wave input would result. The input is applied through transformer 60 whose "center tap" is constituted by a tap on the potentiometer 61. By adjusting this "center tap" slightly off center, the input of tubes 62 and 63 may be unbalanced, producing in their output the wave form illustrated at the left of curve A of Fig. 5. This may be called a compromise between full wave and half wave rectification of a rectangular wave form. By virtue of the full wave rectifying characteristics, both the flat topped positive peaks and the flat topped negative variations of the rectangular input wave appear as negative voltages in the output of tubes 62 and 63. However, on account of the unbalanced condition of the rectifier, one of these conversions (say the conversion of the positive peaks) is more efficient than the other and, therefore, the positive peaks yield larger negative voltages than the negative valleys yield positive voltages.

The above explanation assumes that the only unbalance in the amplifier 62, 63 is that introduced by the setting of potentiometer 61. Actually, however, a separate source of unbalance is introduced by the application of speech signals via transformer 69 to the inner grids of tubes 62 and 63. Such speech signals tend to increase the current through tube 63 and decrease that through tube 62 which, in turn, will increase the degree of unbalance of the output. The degree of unbalance of the resulting waves will vary in dependence upon the magnitude and polarity of the speech signals arriving over transformer 69. When these speech signals attain their maximum positive value, the unbalance will be greatest and the output waves will resemble the left curve A, Fig. 5.

When the speech signals attain their maximum negative value, the unbalance bias will just neutralize the unbalance in the output caused by the asymmetry of potentiometer 61. Assuming perfectly balanced full wave rectification of the rectangular waves applied through transformer 60, the output will be as shown in the right half of curve A, Fig. 5.

Figure 5:
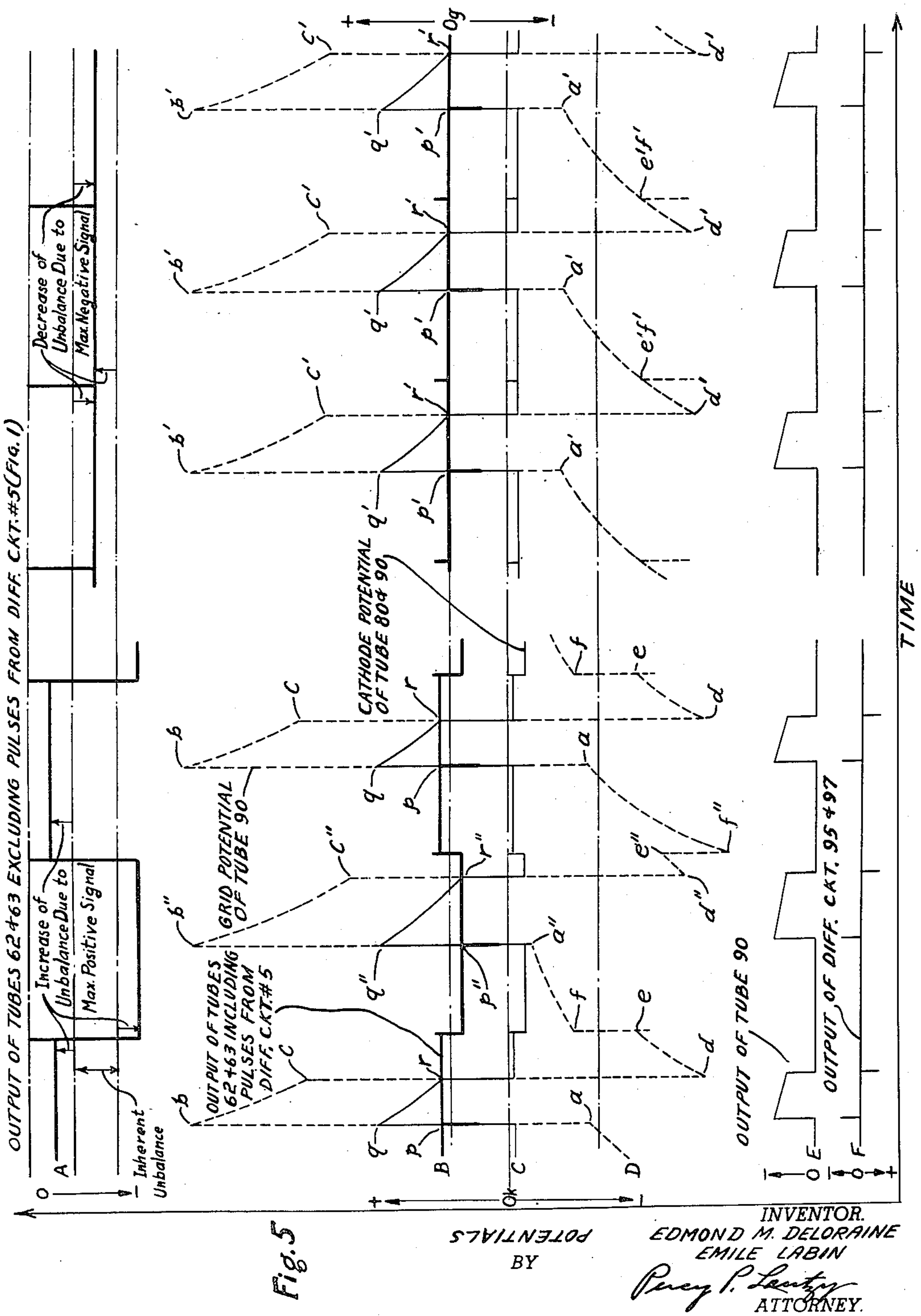

In addition to the rectangular waves and speech waves, the combined effects of which are illustrated in the left and right hand portions of curve A, Fig. 5, there is also applied to the tubes 62 and 63 a series of needle sharp pulses from differentiating circuit 5, Fig. 1. All this will affect the output of tubes 62 and 63 as illustrated in curve B, Fig. 5. This left hand portion of this curve represents the output when speech signals over transformer 69 are maximum, and the right hand portion represents the output of tubes 62 and 63 when said speech signals have their most negative value. Since the amplitude of the pulses applied from circuit 5 may be rather high, the control grids of tubes 62 and 63 to which these pulses are applied are negatively biased from battery 71 through high resistance 70 and potentiometer 72 which is passed by condenser 73. This battery bias is in addition to the negative self-bias of all the grids of these tubes owing to the provision of cathode resistors 64 and 66 which are by-passed by the condensers 65 and 67.

The output of tubes 62 and 63 is applied over the resistance and condenser coupling arrangement 74, 75, 76, to the control grid of a vacuum tube 80. Tube 80 is so connected with another vacuum tube 90 as to form a signal triggered multi-vibrator, i. e., one which may be operated to control the transition from one condition to another, but which operates spontaneously without external control to re-establish the original condition. The multi-vibrator action is produced by the provision between the tubes of a conventional resistance and condenser coupling arrangement 84, 85, 86 together with a back coupling from the output of tube 90 to the input of tube 80 by virtue of the common cathode resistance 81 which has no by-pass condenser. The forward coupling departs from the conventional only in that the values of condenser 85 and resistance 86 are so chosen as to charge condenser 85 to a substantial voltage after a few microseconds.

Assuming that the initial condition of the multi-vibrator 80—90 is one wherein tube 80 is carrying a comparatively high current, thus making its plate far less positive than the potential of the plate supply, such reduction of positive plate potential on tube 80 will tend to apply and maintain a high negative potential upon the control grid of 90 via coupling condenser 85. The capacity of condenser 85 and the resistance of leak 86 are preferably such that after 90 to 150 microseconds the negative signal on the grid of 90 would be attenuated sufficiently to permit this tube to draw current, thus spontaneously transferring the multi-vibrator to the second condition in which tube 90 carries substantial current, while tube 80 is biased below cut-off. However, before such transfer can take place spontaneously, a needle sharp pulse will have been received upon the grid of tube 80, momentarily driving this grid more negative and causing or permitting an increase in positive plate potential which is transmitted through condenser 85 to render tube 90 conducting. As soon as tube 90 begins to draw current the resultant drop in cathode resistance 81 shifts the potential of both cathodes positively. This shift has the effect of making the control grid of tube 80 more negative in relation to its cathode, bringing the grid potential of tube 80 below cut-off.

Although the brief signal which rendered the grid of tube 80 sharply negative vanishes almost as soon as it arrives, the multi-vibrator will nevertheless remain in the condition to which it has thereby been transferred, namely, the condition where tube 90 is carrying substantial current and tube 80 is cut off. The reason for this is that the increased positive potential on the plate of tube 80 continues to act through condenser 85 to hold the grid of tube 90 sufficiently positive to render the tube highly conducting while, on the other hand, the high conductance of tube 90 causes such a drop in cathode resistor 81 as to maintain tube 80 below cut-off.

The action of the multi-vibrator is illustrated in detail in curves B, C and D of Fig. 5. Curve B is a heavy line representing the potential on the control grid of tube 80, curve C is a light line representing the common potential of the cathodes of the two tubes 80 and 90, and curve D a dash line representing the potential of the control grid of tube 90. The curves B and D which represent the potentials of the two control grids are plotted with respect to the zero line 0g, while the curve C representing the potentials of the two cathodes is plotted with respect to a different zero line 0k.

These two different zero axes are used for convenience in order to make the point where a vacuum tube commences to carry current readily apparent from the inspection of the curves. The two zero axes 0g and 0k are displaced by a voltage corresponding to the negative bias required for cut-off for either of the tubes. Intersections of the grid curves, such as curve B or curve D, with the cathode curve C, represent the points where the corresponding tube commences to carry current.

Points *a*, *b* on curve D, represent the transition from the initial condition to the secondary condition under control of the brief needle-like pulse. The portion *b*, *c* of the curve D represents the gradual vanishing through leak 86 of the positive charge on tube 90 as a result of the charging up of condenser 85. At the same time the potentials of the two cathodes will also fall as shown by portion *q*, *r* of curve C.

At point *r* the cathodes just reached such potential that tube 80 can carry current which is indicated by the fact that curve C intersects curve B. The grid of tube 90 becomes more negative, whereupon tube 80 will carry still more current etc.

The abrupt drop of tube 90 from point *c* to point *d* represents the spontaneous shift of the multivibrator from its second condition to its initial condition.

The potential shift of the grid from *e* to *f* is caused by the vertical portion of the rectangular wave form applied to the grid of tube 80. This grid shift has no immediate effect.

The next shift from initial condition to the second condition is represented by *a''*, *b''* produced by the next needle-like impulse.

The portion *c''*, *d''* of the curve represents the next spontaneous restoration to the initial condition.

It will be noted that the time interval between the triggered shift *a*, *b* and the spontaneous restoration *c*, *d* is considerably shorter than the corresponding interval between the triggered shift *a''*, *b''* and the restoration *c''*, *d''*. This results from the negative bias applied to the grid of tube 80 during the interval *p''*, *r''*. No such inequality of successive intervals occurs when the signals on the grid of tube 80 are briefly symmetrical due to a balanced condition of tubes 62, 63.

The output from the plate circuit of tube 90 is shown by curve E of Fig. 5, this curve representing the voltage across load resistor 96. The output coupling condenser 95 is made small and has connected to it an output resistor 97 of low enough value so that the time constant of 95 and 97, together is exceedingly short, i. e. of the order of one or two microseconds. The circuit 95, 97 acts, therefore, as a differentiating circuit so that the output voltage represents the first derivative of the wave form E, consisting of a series of needle sharp pulses alternately reversed in polarity, as shown in curve F of Fig. 5. The negative ones of these needle like pulses (shown extending upwardly in curve F) are uniformly spaced since their time position corresponds to the needle-like pulses of curve B. The positive one of these pulses, however, (shown extending downward in curve F) are non-uniformly spaced depending upon the value of the applied speech signal. Thus, in the left hand portion of curve F, corresponding to an interval of maximum positive potential of the applied signal, the non-uniformity of spacing of these positive output pulses is greatest. In the right hand half of curve F corresponding to an interval of maximum of negative potential of the applied signal, the non-uniformity of spacing of these negative output pulses is zero.

The output of converter 10 includes a series of alternately positive and negative needle sharp pulses, the positive ones of which have a non-uniformity of spacing which is proportional to the voltage of source 8. These positive pulses slightly vary in amplitude as well as in time position, although this effect can be minimized by proper choice of operating adjustments of the multi-vibrator circuit.

Referring again to Fig. 1, the output from the converter is passed through a two-level limiter 11. This two level limiter is adjusted to transmit only a part of the positive portions of the output of converter 10 and none of the negative pulses. After passing through the limiter 11 the signals have the form of a series of needle sharp pulses of equal amplitude but non-uniform time spacing. These pulses are then applied to a combiner unit 13 which serves to combine them with the signals from a speech source 12 carrying unimportant or misleading signals. The combiner 13 may be an ordinary modulator in which amplitudes of the needle sharp pulses are modulated in accordance with the speech signals. Or, as an alternative, a linear amplifier may be used in which the amplitudes of the sharp pulses are added to the amplitudes of the speech signal. The output of combiner 13 may thus have the form of a series of sharp pulses only or the form of a speech wave with substantially larger pulses superposed thereon. In the latter case the next unit must be biased so as to respond only to the needle-like portions of the signal but not to the speech portions alone.

The combined signals from unit 13 are applied to an oscillator 15 which is normally biased to prevent oscillations but is adapted to be brought into the oscillating region by the sharp peaks of the signal from 13. Since the sharp peaks from 13 are not only displaced in time (as at the output of unit 11) but are also of variable peak amplitude (as a result of multiplication by speech signals or superposed upon speech signals), the output from oscillator 15 will consist of short trains of carrier frequency non-uniformly spaced in time and of non-uniform amplitude. The amplitude variations of the carrier trains correspond to the signals from 12 and the time variations to signals from source 8.

*Transmission of signal pulses in the presence of jamming pulses*

When the jamming station, Fig. 2, is in operation, then sharp pulses at the rate of 1200 per second will be produced by units 41, 42, 43, 45 in the same way as by units 1, 2, 3, 4, 5. These pulses modulate or key the oscillator 40 so that brief trains of carrier frequency are delivered from this oscillator over network 46 (if one is provided) to antenna 48. It will be recalled that the jamming station of the simple system A includes only the units 41, 42, 43, 45, 40, 48, and possibly 46 and 47, the additional elements such as 49, 50 and those within the dot-dash lines of Fig. 2 being disregarded for the moment.

It is desirable that signaling pulses which are simultaneously transmitted with jamming pulses be in fixed time relation thereto. To accomplish this, the jam/no jam switch, Fig. 1, is thrown to the right, closing a connection from antenna 18 via network 16 and knife blade *js*5 and *js*6 to the blocking circuit 20. From circuit 20, the received jamming signals pass to unit 21 whose intermediate frequency output goes to a high threshold circuit 30 which is adjusted to pass only signals exceeding a predetermined amplitude level, i. e., the strong signals from the jamming station, and block all weaker signals.

The output of circuit 30 is detected and smoothed in detector 31 whose output consists of a series of sharp pulses coresponding to the output of circuit 45. Assuming that the jamming signals occur at the same frequency as the pulses used in signal transmission, the output of second detector 31 will have a frequency of 12,000 per second. These pulses are passed through a sharply selective circuit 32 which selects the purely sinusoidal 12 kc. component. The circuit 32 should be designed to have as low a decrement as possible, if necessary by providing regeneration. Thus, a flywheel action will be provided which will prevent the system from being thrown out of synchronism by occasional crashes of static which may be high enough to pass the threshold of circuit 30.

The 12 kc. sine wave from circuit 32 is applied to both phase shifters 36 and 33. The latter has no effect at the present time since its output extends through 34 to blocking circuit 22 of the receiving portion of the station which at the moment is disconnected in knife blades *ts*7, *ts*8 of switch TS. The 12 kc. waves passing through phase shifter 36, however, are applied to a half-wave rectifier 37 yielding waves such as were obtained from 2, and as are shown in the right hand side of curve J of Fig. 6.

Figure 6:
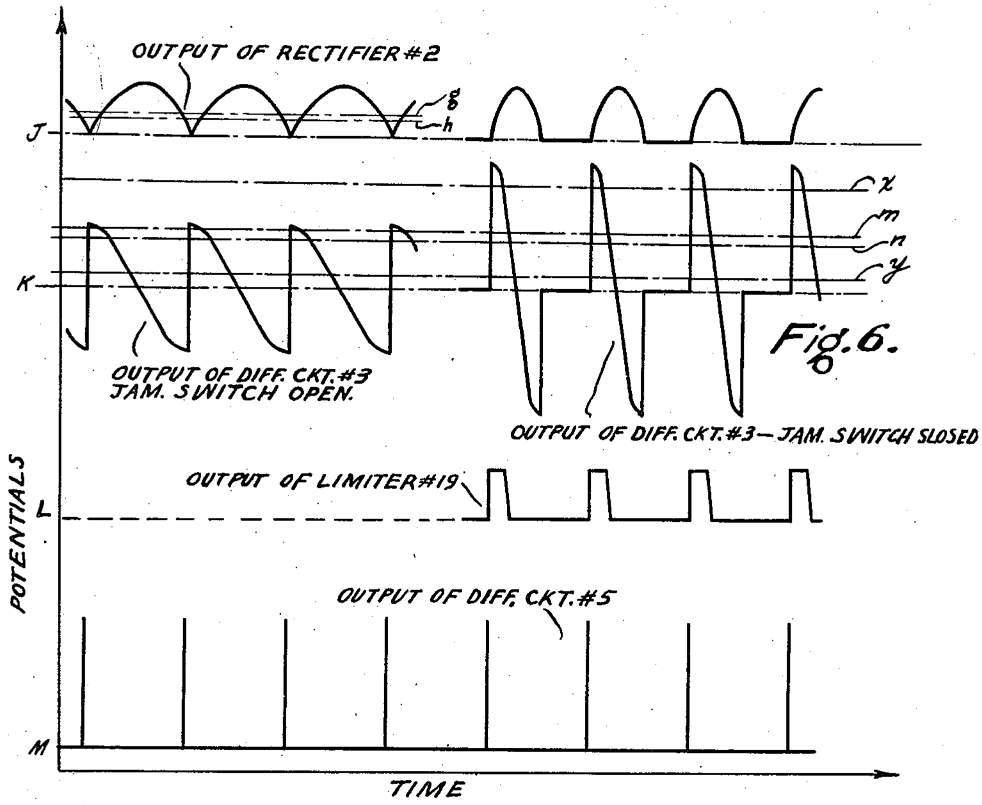
Figs. 5 and 6 are curves useful in describing the operation of the stations shown in Figs. 1 and 4.

From half-wave rectifier 37 the waves pass over knife blades *js*1, *js*2, to differentiating circuit 3 which by differentiation produces waves such as shown in the right hand side of curve K, Fig. 6. The portion lying between levels $x$ and $y$ of this curve passes through two-level limiter 4 and, after further differentiation in circuit 5, the waves resemble the curve M in Fig. 6 which, it will be recalled, correspond to the pulses obtained when full wave rectifier 2 was connected.

The pulses in the output of differentiating circuit 5 have a fixed timing with respect to the jamming signals received instead of a timing related to the local sine wave source 1.

The reduction of a rectangular wave form from these sharp pulses in multi-vibrator 6 and limiter 7 occurs just as in the previous case. The response of converter 10 to the three inputs from 5, 9 and 8, is the same as before and all the succeeding units 11, 12, 13, 15, 16 and 19 operate as before.

One other important change in operation should be noted. Knife blades *js*3, *js*4 close the circuit from the output of differentiating circuit 3 through two-level limiter 19, knife blades *ts*3, *ts*4, *js*3, *js*4 to the blocking circuit 20. The two-level limiter 19 is arranged to pass only so much of the signal from 3 as lies between the thresholds $n$ and $m$. Since the output of circuit 3 has the form shown at the right of curve K in Fig. 6, the portion passed by the two-level limiter 19 will have the form of curve L. The wave L blocks circuit 20 for the short intervals during which oscillator 15 of the transmitter part of the station is operative to transmit signals. Theoretically, if conjugate network 16 provided perfect compensation between the receiver and transmitter, such blocking would be unnecessary; in practice it is required. Using the conjugate network 16, the blocking circuit 20 need only withstand the modulated voltages which may pass through network 16 on account of its imperfect balance. If the network 16 is eliminated, then the blocking circuit 20 must withstand the full voltage from oscillator 15. The blocking may be made more perfect by providing two or more blocked stages in circuit 20.

*Reception of signals in the presence or absence of jamming*

When the talk/listen switch TS is down in the listening position, antenna 18 is connected through network 16 and knife blades *ts*5, *ts*6 to the unit 20 regardless of the position of switch JS. Limiter 19 is now disconnected from the blocking circuit 20 at knife blades *ts*3, *ts*4 and the oscillator 15 is disconnected from the network 16 at blades *ts*1, *ts*2. The station will, therefore, receive regardless of the position of the switch JS.

The operation is as follows: Incoming signals pass from antenna 18 through network 16 and blocking circuit 20 which is not blocked locally since the circuit to its upper terminals is opened at *ts*3, *ts*4. From circuit 20 the signals pass to unit 21 where they are converted to intermediate frequency. From unit 21 the signals pass through blades *ts*7, *ts*8 to externally controlled blocking circuit 22. This circuit normally blocks the signals, but it is adapted to pass them when an unblocking potential is applied to its upper terminals. In a manner to be more fully described, the units 30, 31, 32, 33 and 34 serve to apply such an unblocking potential for a brief period which is so timed as to include the instant of arrival of the desired signal pulse.

Each signal pulse from the unit 21 passes through blocking circuit 22 and is then applied to the two detectors 27 and 35. The detector 27 detects short I. F. trains corresponding to the signal pulses, and its output is smoothed by a low pass filter which not only limits the intermediate frequency ripple from the detector output but removes also the 12 kc. ripple produced by the separate pulses. Only the slower amplitude variations which correspond to the amplitude modulations of the short pulses by source 12 of the signal transmitting station will be picked up in the earphones 29. This may be a meaningless masking signal or an intelligible masking message but concerning routine matters.

The detector 35 also detects the short trains of intermediate frequency waves to yield sharp pulses, but its ripple smoothing arrangement is arranged to eliminate only intermediate frequency ripple and retain the fundamental 12 kc. frequency of the individual pulses and as many harmonics as possible. The output from the detector and smother unit 35 will have substantially the original needle sharp wave form of the pulses from the transmitting station. These sharp pulses are then passed through a two-level limiter 23 to eliminate the rounding corners and amplitude modulation, and to accentuate the harmonics.

From limiter 23 the waves, which are now characterized by variable time position but constant amplitude, pass through a harmonic selector 24 which is tuned to the 11th harmonic of half the pulse frequency, i. e., 6 kc. The harmonic selector may be tuned, but not so sharply as to clip the side band representing speech. For low quality speech of 60–3000 c. p. s., a simple tuned circuit of modernate Q may be used, especially when a harmonic as high as the 11th is selected. For higher quality speech, however, or when a lower harmonic must be selected, a band pass filter should replace the harmonic selector 24.

As described in the copending application of Emile Labin above referred to, the amplitude of any odd harmonic of half the pulse frequency will be proportional to the degree of non-uniformity in the time spacing of the pulses, and thus to the amplitude of the secret signal from source 8. The proportionality is truly linear only when the maximum positional non-uniformity of the pulses is very small and when the harmonic selected is not too high. Greater amplitude variations can be obtained with the higher harmonics. Under most practical conditions, if the amount of variation in time position is kept small in comparison with the total cycle time, i. e., of the order of 2% thereof, it is desirable to use a rather high odd harmonic such as the 11th. In most cases the primary limitation in the selection of the harmonic is the impossibility of maintaining pulses needle sharp, whereby the higher harmonics (say the 15th and higher) tend to fall half in amplitude. The preferable upper limit of harmonic selector 24 is, therefore, a 6 kc. wave whose amplitude varies in accordance with the secret speech from source 8 of the transmitting station. The output of this harmonic selector is then applied to a detector 25 which is provided with means for smoothing out the 66 kc. ripple. The output of detector 24 is made audible in earphones 26 which reproduce the secret speed signals from source 8 at the transmitting station.

It has been mentioned that units 30, 31, 32, 33 and 34 serve to provide a de-blocking signal for circuit 22 at brief time intervals corresponding to the desired incoming pulses. The manner in which this is done depends somewhat upon whether the signals are received in the presence or absence of jamming.

Let us assume first that the TS switch is in the listening or down position, that the JS switch is closed, and that no jamming pulses are received. Threshold circuit 30 just passes the signal pulses and occasionally a small amount of static and other disturbances which have no harmful effect. From the high threshold circuit 30 the pulses and occasional static pass through the second detector 31 and thence through the sharply selected circuit 32 which by its flywheel action prevents the static from having any substantial desynchronizing effect. The 12 kc. sine waves from 32 which have a definite time relation to the incoming signal pulses are then passed through phase shifter 33 and then through the two-level limiter 34. The levels of limiter 34 are chosen very close to each other and to the peak level of the sine waves which will, therefore, be close to their apices. Only those portions of the waves pass through limiter 34 which are approximately rectangular and of comparatively short duration, say one-tenth of a cycle long. The phase shifter 33 is adjusted to time these brief de-blocking pulses of substantially rectangular wave form so as to unblock circuit 22 just before the arrival of each one of the desired pulses from unit 21 and to maintain this circuit unblocked until slightly after each such pulse has ceased.

When jamming pulses are received with the signal pulses, the operation is essentially the same except that threshold circuit 30 passes only the stronger jamming pulses but not the weaker signaling pulses, the phase shifter being correspondingly readjusted. Since the jamming pulses have a definite time relation to the signal pulses, they may be used successfully for controlling the de-blocking.

VARIATIONS OF SYSTEM A

*System B with monitoring at jamming station*

In the simple System A, the jamming station had no means for ascertaining whether its wave length was such as to cause the most interference with the enemy's communications nor whether the friendly signals were properly synchronized with its jamming pulses. To provide for such supervision the jamming station may be modified to include the complete circuit of Fig. 2. The system including such modified jamming station, together with a plurality of combined signal transmitting and receiving stations according to Fig. 1, will be referred to as System B. To facilitate comparison, the same units digits are used to designate corresponding elements of Figs. 1 and 2.

The additional equipment in Fig. 2 comprises two receivers 51 and 55 arranged to apply their outputs to two cathode ray tubes 52 and 57, respectively. Means are provided for cyclically tuning the second receiver 55 over a wave band wide enough to cover all or part of the frequency spectrum likely to be used by the enemy. Accessory equipment 161, 162, 54 is needed for rendering the cyclically tuned receiver 55 insensitive to the friendly signal pulses, and equipment 49, 50 for rendering both receivers 51 and 55 insensitive to the pulses from the jamming transmission station. Suitable sweep circuit generators 53 and 58 are provided for the tubes 52 and 57.

The method of operation of the jamming station is the same as before as far as transmission of jamming pulses is concerned. The monitoring operation is as follows:

The enemy signals and friendly signals are both received on antenna 48 and transmitted over network 46 to the blocking circuit 50. This circuit normally passes signals but is arranged to block transmission of all signals for a brief moment when jamming trains and carrier frequency are emitted from oscillator 40. Such momentary blocking pulses are delivered over two-level limiter 49, which receives part of the output from differentiating circuit 43, in the same manner as the corresponding blocking circuit 20 is controled by two-level limiter 19 in Fig. 1.

Except for brief blocked intervals when jamming trains are sent out by the station itself, the incoming enemy and friendly signals pass through circuit 50 to the receiver 51, which is manually turned to the frequency of the friendly stations. The output of this receiver is applied to the vertical deflecting plates of cathode ray tube 52. The horizontal sweep wave generator 53 is triggered by the needle sharp waves from differentiating circuit 45 giving the saw tooth waves a fixed time relation with respect to the jamming waves sent out. The time position of the friendly transmission waves received by receiver 51 will, therefore, be shown on the screen of cathode ray tube 52 in relation to the timing of the jamming waves from the jamming transmission station itself.

The balance of the energy from blocking circuit 50 is applied through a circuit 54 to receiver 55 which is automatically cyclically tuned by motor 56. This motor 56 drives also a rotary generator adapted to produce saw tooth wave forms suitable for a sweep circuit. Such rotary generator may be a magnetic generator with specially formed pole pieces, or it may consist of a rotating potentiometer and a battery connected thereto.

The outputs from receiver 55 and from rotary generator 58 are applied, respectively, to the horizontal and vertical deflection plates of cathode ray tube 57. The generator 58 is synchronized with the tuning receiver 55 in such a way that for each different frequency for which receiver 55 is tuned, the generator 58 will give a different output potential, the potential preferably varying linearly with the frequency to which the receiver 55 is tuned. The screen of cathode ray tube 57 will, therefore, show a vertical line produced by the varying sweep voltages from generator 58 horizontally deflected at the point corresponding to the frequency of the enemy's communications.

If the enemy has two or more frequencies of communication, a corresponding number of horizontal deflections will appear upon the screen.

A small amount of energy from the oscillator 40 of the jamming station may be transmitted over leads L54 and key 66 to the input of receiver 55, so that a horizontal deflection will also appear on the screen of tube 57 indicating the frequency of oscillator 40 provided at the transmitting station. If the oscillator 40 is accurately tuned to the same frequency as the enemy's communications, the deflection occurring in response to the depression of the key 66 would fall exactly on top of the deflection representing the enemy's communication frequency.

In order to prevent the receiver 55 from responding to energy from the friendly signal transmitting station which is assumed to be operating in synchronism with the jamming pulse transmission station, the apparatus 160, 161 and 162 may be provided periodically to transmit blocking potentials to the circuit 54. The length of application of blocking potentials may be manually controlled to occur in a predetermined timed relation to the instant of transmission of pulses from the jamming transmission station.

Units 161 and 162 of this equipment operate as indicated in the left hand portion of curve J, Fig. 6, the rectifier unit 61 serving to produce half sine waves, and the two-level limiter 162 to pass only those portions of these half sine waves which lie between levels $g$ and $h$. The blocking arrangement 54 is normally adjusted to block passage of current from 50 to 55 but is unblocked by the substantially rectangular waves which pass through limiter 62. The portions lying between the limits $g$ and $h$ of curve J fill most of the cycle time so that the circuit 54 will be unblocked by these impulses for the greater part of the cycle and will only be returned to blocking position for a brief interval in each cycle. By adjustment of phase shifter 160 the time position of the brief blocking interval can be made to cover the instant when pulses are transmitted by the friendly signal transmitting equipment.

It will be seen, therefore, that the blocking circuit 50 serves to protect receiver 55 from the signals emitted by the local oscillator 40 of the jamming signal transmitter, while blocking the circuit 54 protects the receiver 55 from the friendly remote transmitter such as shown in Fig. 1. The only signals which will affect receiver 55 will be those of the enemy's communications, and only the frequencies of the enemy's communications will be indicated on the screen of tube 57 except when the frequency of the oscillator 40 is shown upon the depression of key 166.

Ordinarily in operating System A or System B, it is assumed that the jamming station will be found to have the same frequency as the enemy's communications. The friendly signal transmitting stations, Fig. 1, will also be tuned to this frequency or to a frequency very close thereto. If the enemy varies his frequency so as to escape, the jamming signal will at once show up on the screen of cathode tube 57. If, on the other hand, the transmitter of a friendly station, Fig. 1, gets out of synchronism with the jamming transmission station, e. g. by being slightly mistuned, this fact will be indicated upon the screen of cathode ray tube 52.

SYSTEM C

Figure 4:
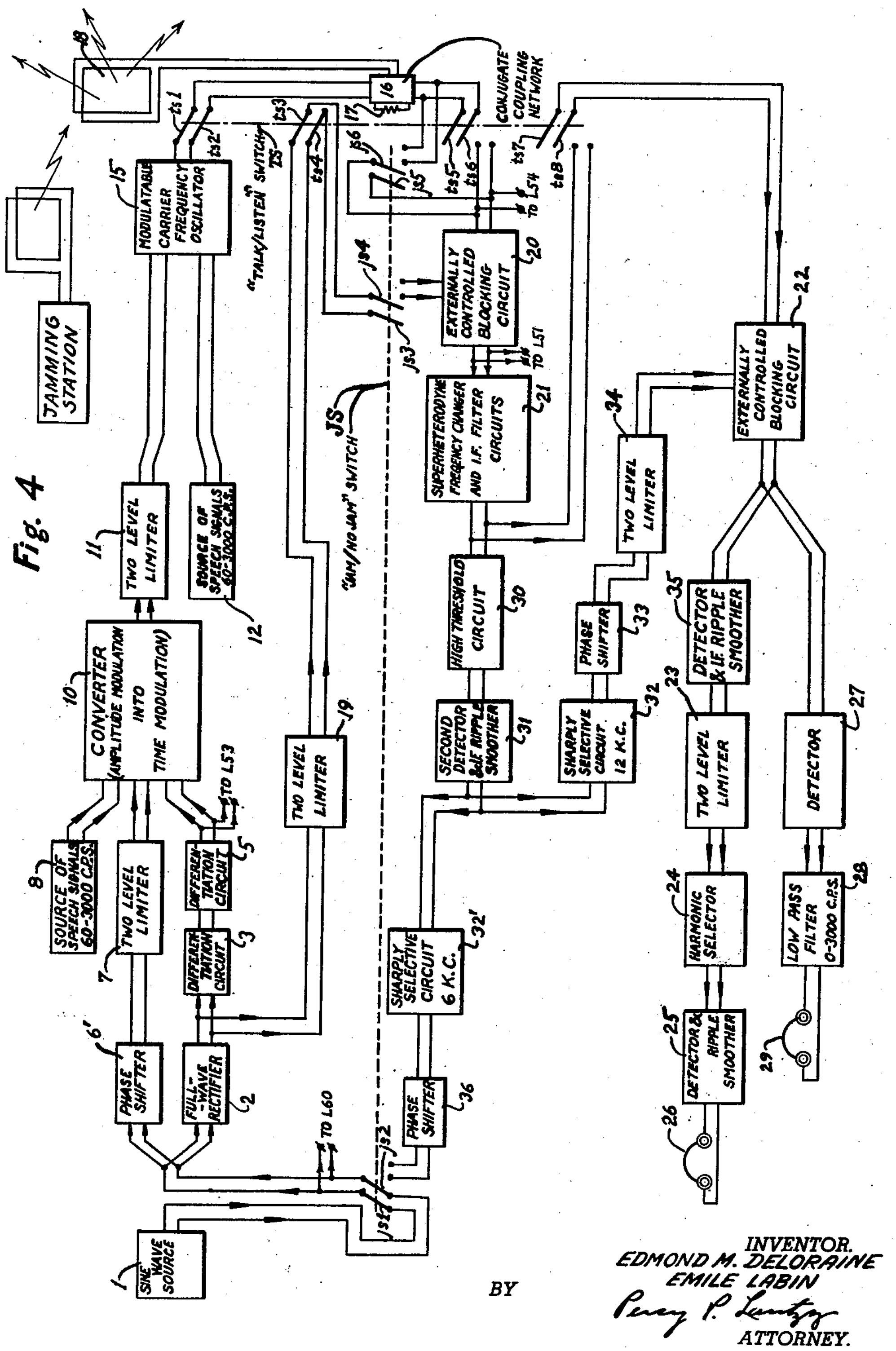
Fig. 4 represents another form of combined signal transmitting and receiving station which may be used in place of the embodiment shown in Fig. 1.

Fig. 4 represents a slightly modified form of combined signal transmitting and receiving station which may be substituted for that of Fig. 1. When such modified system is employed, the jamming station should be modified to emit pulses at the rate of 6000 per second or a submultiple thereof rather than 12,000 per second. In describing System C it will be assumed that source 41 of the jamming station of Fig. 2 operates at 3 kc. instead of 6 kc., thus causing the emitted pulses to occur at the rate of 6000 per second.

The combined signal transmitting and receiving station of Fig. 4 very closely resembles that of Fig. 1, the like numbered components being identical. The chief differences are:

($a$) Full-wave receiver 2 is connected through knife blades $js1$, $js2$, and the half-wave rectifier 37 is omitted.

($b$) The feed from 31 to phase shifter 36 now passes through a modified selective circuit 32' which is tuned to 6 kc. instead of 12 kc. like circuit 32. The 12 kc. circuit 32 is retained but feeds only the phase shifter 33 and not 36.

(c) The rectangular input pulses of converter 10 are obtained by doubly limiting sine waves from source 1 and not as in Fig. 1 by operating a doubly triggered multi-vibrator 6 fed from the output of 5. The two-level limiter 7 is, therefore, set to pass only the portion of the sine wave adjacent the zero axis, producing an almost rectangular wave form with the peaks and valleys of substantially equal length.

The operation of Fig. 4 is similar to Fig. 1 and need be only briefly described. The sharp pulses for application to converter 10 are obtained as before, except that the limiter 4 is omitted. The rectangular waves which form another input to converter 10 are obtained by the limiting of the waves from source 1 in limiter 7. The time position of the rectangular waves with respect to the needle sharp input waves is regulated by phase shifter 6' instead of by an artificial line 9, as in Fig. 1.

The functioning of converter 10 and of the succeeding equipment 11, 12, 15, 16, 17 and 18 is the same as before.

When the transmitting equipment of Fig. 4 is operated during jamming, the incoming jamming pulses received by 18 pass through 16, thence through *js*5 and *js*6 to 20, and thence through 21, 30 and 31, exactly as before, except that pulses occur with a frequency of 6000 per second. From the output of detector 31, the pulses pass through a sharply selective circuit 32' tuned to 6 kc. and thence through a phase shifter 36 to the knife blades *js*1, *js*2.

The waves thus received via 36 from 32' are like the waves which would be received from source 1 in the absence of jamming and, therefore the rest of the transmitter operates without jamming.

In the case of reception without jamming, Fig. 4 operates like Fig. 1, the 12 kc. circuit 32 responding to the pulses and un-blocking circuit 22 so as to pass these pulses.

In the case of reception during jamming, the high threshold circuit 30 is adjusted to pass only the jamming pulses as in Fig. 1. After detection in 31 the 6 kc. pulses go through circuit 32'. Since, however, the sharp pulses are very rich in harmonics, a substantially 12 kc. component will exist and pass through circuit 32 and thence through phase shifter 33 and limiter 34 to un-block circuit 22 at the required times. The remainder of the receiving operations are the same as in Fig. 1.

Although in Systems A, B, and C, the jamming transmission station was assumed to be unmodulated, it is clear that only a small amount of interference will be created by super-audible unmodulated jamming pulses of uniform amplitude and spacing. To increase the effectiveness of the jamming, the frequency of the source 41 may be reduced below 3 kc., e. g. to 1.5 or .75 kc., or lower. At a frequency of .375 kc., the emitted pulses will recur with a frequency of .75 kc. and a hostile station will find it difficult to hear speech messages, since pulses recurring at 750 cycles per second represent substantially interfering noise levels at 750 cycles, 1500 cycles, 3000 cycles and 6000 cycles, all within the audible range.

Systems A, B and C may be modified by using very low audible frequency for the jamming pulses. The adjustments of elements 32 and 32' in Figs. 1 and 4, need not be altered since even at a fundamental frequency of .375 kc. or lower there will be enough 6 kc. and 12 kc. components to actuate these circuits. Such modified systems will be referred to as A', B' and C'.

A still more desirable effect is produced by modulating the jamming pulses at one or more audio frequencies. For example, the jamming pulses from differentiating circuit 45 (Fig. 2) may be modulated by audio signals from a source 176 in a modulator 175 before being used to modulate oscillator 40.

The jamming station may then be combined with Fig. 1, and operated with switch JS in the no-jam position illustrated. The unused portions of the station could be omitted, or all the equipment shown in Fig. 1 could be retained to permit the alternative use of a remote jamming station.

If instead of the station equipment of Fig. 1, that of Fig. 4 is employed as the jamming station, suitable jamming noises are supplied to source 8. The switch JS is in the no-jam position so as to make the station independent of outside influences.

The monitoring equipment shown within the dot-dash lines of Fig. 2 could be connected to the circuit of Fig. 4 when the latter is used as a jamming transmission station, the leads L51, L53, L55 and L60 being connected to the correspondingly labeled terminals in Fig. 4. With the monitoring equipment added to Fig. 4, System E is changed into a very flexible system.

In all the embodiments, when simultaneous message and jamming signal transmission was desired, the signal transmitting station synchronized itself with the jamming station. For a great many purposes it is preferable to reverse the procedure and arrange that the jamming pulse transmitting station should synchronize itself with the message signal transmitting station, the latter being then operated under the control of its local source. For this purpose, the equipment of Fig. 1 is used as the jamming signal transmitting station 3 with the switch JS in the jammed position, suitable audio frequencies being applied to source 12 to produce the jamming signals.

A plurality of combined signal transmitting and receiving stations like Fig. 1 may be operated with their switches JS in the no-jam position at all times. When one of these stations is transmitting it will be under the control of its local oscillator 1. A jamming station like Fig. 1 will have its switch JS in the jam position and will synchronize itself with the message signals received from another station.

If it is desired to employ the circuits of Fig. 4 in the last mentioned system, the jamming station should be arranged to operate at two or more times the frequency of the signal transmitting and receiving stations. Circuit 32' of the jamming station should then be adjusted to 12 kc., and the converter unit 10 should respond to sharp pulses occurring at the rate of 2400 per second. The sine wave source 1 may be completely eliminated since the jamming station will be used only with the switch JS thrown to the right. Likewise the elements 32, 33, 34, 22, 35, 23, 24, 25, 26, 27, 28 and 29 may be omitted.

This system may be amplified by adding to the jamming station, i. e., to the station which has been stepped up in frequency and has had the receiving portions deleted, the monitoring equipment of Fig. 2.

Alternatively, the monitoring equipment may be applied to the several combined signal transmitting and receiving stations.

In any of the above systems the jamming signals may be modulated with apparently bona fide masking messages instead of with random noises in order still further to confuse the enemy and still further conceal that speech signals are being simultaneously transmitted by one of the signal transmitting stations.

If the jamming station and the signal transmitting stations are so far apart that the time of propagation of radio waves from one to the other is substantial, a third station disposed at unequal distance from the jamming and transmitting stations may simultaneously receive the jamming and signaling pulses. If the stations operate at a pulse frequency of 12,000 per second, this could happen only if the distance between the stations corresponded to a time interval of at least the same order of magnitude. No such difficulties could occur at the contemplated pulse frequencies. However, if higher quality speech transmission is desired, this limitation of the system should be borne in mind.

We claim:

1. The method of masking messages comprising the following steps: producing impulses, modulating at least some of said impulses in accordance with one system of modulation by one message, and modulating at least some of said impulses in accordance with a different system of modulation by a second mesage.

2. The method of masking messages comprising the following steps: modulating impulses by one message in accordance with one system of modulation, and modulating at least some of the modulated impulses by the second message in accordance with a different system of modulation.

3. In combination, means for producing impulses, a first source of signals, means for modulating at least some of said impulses in accordance with one system of modulation by the signals from said first source, a second source of signals, and means for modulating at least some of said impulses in accordance with a different system of modulation by the signals from said second source.

4. In a secrecy transmission system, means for producing impulses, a first source of signals, means for modulating at least some of said impulses in accordance with one system of modulation by the signals from said first source, a second source of signals, means for modulating at least some of said impulses in accordance with a different system of modulation by the signals from said second source, means for combining the outputs of both said means for modulating, and means for transmitting the combined modulated impulses.

5. In a transmitter, means for producing impulses, a first source of signals, means for modulating at least some of said impulses in accordance with one system of modulation by the signals from said first source, a second source of signals, means for modulating at least some of said impulses in accordance with a different system of modulation by the signals from said second source, a source of carrier frequency, and means for modulating the carrier by all said modulated signals.

6. In a transmitter, means for producing impulses, a first source of signals, means for modulating at least some of said impulses in accordance with one system of modulation by the signals from said first source, a second source of signals, and means for modulating at least some of the modulated impulses in accordance with a different system of modulation by the signals from said second source.

7. In a transmitter, means for producing a series of impulses spaced apart in predetermined relationship in time, a first source of signals, means for time modulating at least some of said impulses to vary their positions in accordance with signals from said first source, and means for amplitude modulating at least some of said impulses.

8. In a transmission system, means for producing a series of impulses spaced apart in predetermined relationship in time, a first source signal energy, modulation means for time modulating said impulses to vary their positions in accordance with signals from said first source, a second source of signals, and means for amplitude modulating said time displaced impulses in accordance with signals from said second source of signals.

9. In a transmission system according to claim 8, further comprising an amplitude limiter to limit the amplitude of said time modulated impulses to substantially the same level before modulation by signals from said second source.

10. In a receiver for time and amplitude modulated brief trains of carrier signal waves, a first detector responsive to the amplitude variations of the signals, a second detector responsive to the signal waves, a limiter connected with the second detector to eliminate amplitude modulation from the detected signals, and a harmonic selector connected with said limiter and to produce signals having an amplitude envelope corresponding to the time modulation of the signal waves.

11. The receiver according to claim 10, an antenna, a blocking circuit connecting said detectors with the antenna, said circuit being adapted to pass signals of a certain range of frequencies except when blocking signals are applied thereto, and means for periodically applying blocking signals to the blocking circuit.

12. In a receiver for time and amplitude modulated brief trains of carrier signal waves, an antenna, a first blocking circuit connected therewith and adapted to pass signals of a certain range frequency except when blocking signals are applied thereto, a frequency changer connected with the blocking circuit, a second blocking circuit connected with the frequency changer and adapted to block all signals except when a signal potential of predetermined magnitude is applied thereto, means operable at will at the reeciver for periodically applying said blocking signal to the first blocking circuit and the said signal potential to the second blocking circuit, a first detector responsive to the amplitude variations of the signals connected with the second blocking circuit, a second detector responsive to the signal waves connected in multiple with the first detector, a two-level amplitude limiter connected with the second detector to eliminate amplitude and noise modulation from the detected signals, a harmonic selector connected with said limiter and adapted to produce signals having an amplitude envelope corresponding to the time modulation of the signal waves, and a detector for the last-mentioned signals.

13. In a receiver for time and amplitude modulated signals, an antenna, a low frequency filter circuit connected with the antenna, a high threshold circuit for passing only that part of the output of said filter circuit which exceeds a predetermined amplitude level, means for detecting and smoothing the output of the last mentioned circuit, a circuit for selecting a sinusoidal component of the output of the last means, a detector for all signals, a second detector for the amplitude modulation of the signals, a circuit for blocking both detectors except when predetermined potentials are applied thereto, and two connections for applying such potentials, one connected with the output of the sinusoidal component selecting circuit and the other with the output of the filter circuit.

14. In combination, a radio transmitter, a radio receiver, output terminals for the transmitter and input terminals for the receiver, an antenna, a conjugate coupling network coupled with the antenna and comprising also terminals for the transmitter and terminals for the receiver whose conjugacy is preserved, and a two-position talk-listen switch having contacts connecting in one position only the terminals of the transmitter and in the second position only those of the receiver with the corresponding terminals in the network.

15. In a communication system, means for producing a series of impulses spaced apart in predetermined relationship in time, a first source signal energy, modulation means for time modulating said impulses to vary their positions in accordance with signals from said first source, a second source of signals, means for amplitude modulating said time displaced impulses in accordance with signals from said second source of signals, means for receiving said impulses modulated by signals from said first and second sources, means for detecting said received signals to reproduce signals from said second source, selection and limiting means for reproducing said time modulated impulses independently of said amplitude modulation, and means for reproducing signals from said first source under control of said reproduced impulses.

16. In a communication system, means for producing a series of impulses spaced apart in predetermined relationship in time, a first source signal energy, modulation means for time modulating said impulses to vary their positions in accordance with signals from said first source, a second source of signals, means for amplitude modulating said time displaced impulses in accordance with signals from said second source of signals, means for receiving said impulses modulated by signals from said first and second sources, selection and limiting means for reproducing said time modulated impulses independently of said amplitude modulation, and means for reproducing signals from said first source under control of said reproduced impulses.

17. In combination, a radio receiver, means for cyclically tuning the receiver through a range of frequencies, means for visually indicating the frequency of the signals received, a source of jamming signals, means including said receiver for visually indicating the relationship between the frequencies of the jamming and other signals received, and a second source of jamming signals controlling said receiver.

18. A communication system for pulse transmission comprising means for producing a series of impulses spaced apart in predetermined relationship in time, a first source signal energy, modulation means for time modulating said impulses to vary their positions in accordance with signals from said first source, a second source of signals, means for amplitude modulating said time displaced impulses in accordance with signals from said second source of signals, a jamming station for producing jamming impulses, means for adjusting the frequency of said jamming station, means for indicating the normal time spacing of said impulses, and the time position of said jamming pulses with respect to said impulses.

19. A communication system for pulse transmission comprising means for producing a series of impulses spaced apart in predetermined relationship in time, a first source signal energy, modulation means for time modulating said impulses to vary their positions in accordance with signals from said first source, a second source of signals, means for amplitude modulating said time displaced impulses in accordance with signals from said second source of signals, a first station comprising means for emitting jamming signals, a second station having radiating means for emitting said impulses modulated with signals from said first and second sources, means for receiving said jamming signals at said second station, means for producing waves under control of said received jamming signals, and means under control of said produced waves for operating said impulse producing means, whereby production of said impulses will be synchronized with said jamming signals.

20. In combination, a radio signal receiver, means for cyclically tuning the receiver through a range of frequencies, a cathode ray tube having pairs of vertical and horizontal deflecting plates, a circuit for applying the output of the receiver to one pair of plates, a sweep circuit generator connected with the other pair of plates, means to alter the potential output of said generator in relation to the frequency to which the receiver is tuned, whereby the frequency of the radio signals received will be visually indicated, a source of jamming signals, means operable at will for applying jamming signals to the receiver, a blocking circuit connected with said receiver, the point of application of said jamming signals being in the connection between the receiver and the blocking circuit, a second source of jamming signals, and means for applying signals from the second source to the blocking circuit to unblock the receiver.

21. In combination, a receiver of radio signals, means operable at will for tuning said receiver, a cathode ray tube having a pair of horizontal and a pair of vertical deflecting plates, a connection from the receiver to one pair of plates, a sweep generator connected to the other pair of plates, means for transmitting jamming waves, and a control circuit for said generator controlled by the last mentioned means.

22. In combination, a first radio signal receiver, means for cyclically tuning the receiver through a range of frequencies, a first cathode ray tube having pairs of vertical and horizontal deflecting plates, a circuit for applying the output of the receiver to one pair of plates, a first sweep circuit generator connected with the other pair of plates, means to alter the potential output of said generator in relation to the frequency to which the receiver is tuned, a source of jamming signals, means for controlling the operation of said receiver by jamming signals, a second receiver, means operable at will for tuning the second receiver, a second cathode ray tube having pairs of vertical and rotary deflecting plates, a connection from the second receiver to one pair of the last-mentioned plates, a second sweep circuit generator connected with the second pair of the last-mentioned plates, and a control circuit for the last-mentioned generator controlled by jamming signals.

23. In combination, a radio signal receiver, means for cyclically tuning the receiver through a range of frequencies, an antenna, a first blocking circuit connected with the antenna and adapted to pass signals within said range of frequencies, a second blocking circuit through which the first blocking circuit is connected with the receiver, said second circuit normally blocking passage of all signals, but unblocked when certain signals are applied thereto, a cathode ray tube having pairs of vertical and horizontal deflecting plates, a circuit for applying the output of the receiver to one pair of plates, a sweep circuit generator connected with the other pair of plates, means to alter the potential output of said generator in relation to the frequency to which the receiver is tuned, a source of signals and means for periodically applying to the second circuit said certain signals from said source.

24. The combination according to claim 23, and means for periodically applying signals from said source to the first blocking circuit to block the passage of signals therethrough.

25. In combination, a radio signal receiver, means for cyclically tuning the receiver through a range of frequencies, an antenna, a first blocking circuit connected with the antenna and adapted to pass only signals within said range of frequencies, a second blocking circuit through which the first blocking circuit is connected with the receiver, said second circuit normally blocking passage of all signals, but unblocked when certain signals are applied thereto, a cathode ray tube having pairs of vertical and horizontal deflecting plates, a circuit for applying the output of the receiver to one pair of plates, a sweep circuit generator connected with the other pair of plates, means to alter the potential output of said generator in relation to the frequency to which the receiver is tuned, a source of signals, means for directly coupling said antenna with the receiver, means for periodically applying to the second circuit said certain signals from said source, a second receiver tunable at will connected with the first blocking circuit, a second cathode ray tube having pairs of horizontal and vertical deflecting plates, a connection between one pair of plates of the second tube and the second receiver, a second sweep circuit generator connected with the second pair of plates of the second tube means for periodically applying signals from said source to the first blocking circuit to block the passage of signals therethrough, and means for periodically applying signals from said source to the second sweep circuit generator to control its operation.

26. The method of masking messages comprising the following steps; producing at one station impulses of a certain frequency, modulating at the same station the impulses by jamming signals, transmitting the modulated jamming signals, receiving the signals at a second station and converting them into impulses having a frequency bearing a predetermined relationship to said certain frequency, modulating at the second station at least some of the impulses by secret message signals in accordance with one system of modulation, modulating at the second station at least some of the impulses by a masking message in accordance with a second system of modulation, combining the modulated signals at the second station, and transmitting the combined signals from the second station.

27. The method of masking messages comprising the following steps; producing impulses having a predetermined time spacing, modulating the spacing of at least some of the impulses by jamming signals, modulating the amplitude of at least some of the impulses by message signals, combining the time and amplitude modulated impulses, and modulating in time spacing at least some of the impulses by other message signals.

28. In communication system, means for producing impulses having a certain time spacing, a first source of signals, means for modulating the spacing of at least some of said impulses in accordance with signals from said first source, a second source of signals, means for the modulating amplitude of at least some of said impulses by signals from the second source, a first station, means at the station for combining and transmitting the modulated impulses, a second station, a source of jamming impulses thereat, and means for controlling the time relationship of the transmitting of jamming impulses from the second station to the transmitting of the combined modulated impulses from the first station.

29. The system according to claim 28, and in which the means for controlling the time relationship is at the first station.

30. The system according to claim 28, and in which the means for controlling the time relationship is at the second station.

31. The system according to claim 28 and in which the spacing of the signaling and jamming impulses bears the relationship of two-to-one.

32. In a communication system, a first station having a radio transmitter, an antenna, a sine wave source, means for converting the sine waves into a series of impulses having a certain time spacing, a first source of signals, means for modulating the spacing of at least some of the impulses in accordance with signals from the first source, a second source of signals, means for modulating the amplitude of at least some of the time modulated impulses in accordance with signals of the second source, a generator of a high frequency carrier, means for modulating the carrier by the time and amplitude modulated impulses, a receiver at the station having means for detecting impulses received by the antenna, means in the receiver for reproducing the amplitude modulation of the impulses, means in the receiver for reproducing the time modulation of the impulses, a jamming station comprising means for producing impulses spaced apart in a predetermined relationship to said certain time spacing, a generator of said high frequency carrier at the jamming station, means for transmitting the last-mentioned carrier modulated by the last-mentioned impulses, a first switch at the first station having one position for connecting the transmitter and a second position for effectively connecting the receiver with the antenna, a second switch at the first station, means controlled by the second switch and operative in the first position of the first switch for disconnecting the means for converting from the associated sine wave source and connecting it with the antenna, and means controlled by the second switch and operable in the second position of the first switch for applying the jamming signals received by the antenna to the receiver to block its operation.

33. The system according to claim 32, and means controlled by the second switch for converting the jamming impulses received by the antenna into impulses of an intermediate frequency, a circuit for passing only intermediate frequency impulses exceeding a predetermined amplitude level, means for detecting and smoothing the output of the last-mentioned circuit, and a circuit for selecting a sinusoidal component of the output of the last-mentioned means having a predetermined relationship to the frequency of said sine wave source.

34. The method of secrecy communication comprising the following steps; time modulating impulses by secret message signals, amplitude modulating the time modulated impulses by masking message signals, transmitting the time and amplitude modulated impulses on a carrier, detecting the time and amplitude modulated impulses, separately reproducing the amplitude and the time modulation of the signals, sending jamming signals in synchronism with the transmitting of the time and amplitude modulated signals, and blocking the detecting by the jamming signals.

35. The method of claim 34, and in which the detecting and reproducing are performed at one station and all the other steps at another station.

36. The method of claim 34, and in which all the steps are performed at the same station.

37. The method of secrecy communication comprising the following steps: time modulating impulses by secret message signals, amplitude modulating the time modulated impulses by masking message signals, transmitting from a station the time and amplitude modulated impulses on a carrier, detecting at a second station the time and amplitude modulated impulses, separately reproducing the amplitude and the time modulation of the signals, sending from a third station jamming signals in synchronism with the transmitting of the time and amplitude modulated signals, and blocking the detecting by the jamming signals.

38. In combination, a source of carrier wave of high frequency oscillations, means for producing a succession of pulses, means for time modulating said pulses in accordance with a first signal, means for modulating the energy content of said time modulated pulses in accordance with a second signal, and means for transmitting said plural modulated pulses on said carrier wave.

39. In a pulse modulation communication system, the method of operation which includes producing variable energy content and variable repetition rate pulses whose variations in weight are in accordance with variations in the signal modulation.

40. In a communication system, the method of operation which includes producing pulses that vary both in energy content and repetition rate, at least one of said variations being in accordance with variations in a signal.

41. In combination, a receiver of signaling waves, means for cyclically tuning the receiver through a range of frequencies, a cathode ray tube having pairs of vertical and horizontal deflecting plates, a circuit for applying the output of the receiver to one pair of plates, a sweep circuit generator connected with the other pair of plates, and means to alter the potential output of said generator in relation to the frequency to which the receiver is tuned, a blocking circuit for said receiver, a transmitter and means controlled by the transmitter for unblocking said circuit.

EDMOND M. DELORAINE.
EMILE LABIN.

REFERENCES CITED

The following references are of record in the file of this patent:

UNITED STATES PATENTS

| Number | Name | Date |
|---|---|---|
| 1,446,433 | Schaffer | Feb. 20, 1923 |
| 1,973,298 | Sloggett et al. | Sept. 11, 1934 |
| 2,151,747 | Conrad | Mar. 28, 1939 |
| 2,156,374 | Crosby | May 2, 1939 |
| 2,227,108 | Roosenstein | Dec. 31, 1940 |
| 2,262,838 | Deloraine et al. | Nov. 18, 1941 |
| 2,266,194 | Guanella | Dec. 16, 1941 |
| 2,279,151 | Wallace | Apr. 7, 1942 |
| 2,381,847 | Ullrich | Aug. 7, 1945 |
| 2,392,546 | Peterson | Jan. 8, 1946 |

FOREIGN PATENTS

| Number | Country | Date |
|---|---|---|
| 541,665 | Great Britain | Dec. 5, 1941 |